INVENTOR:
LÉGER SALVY
BY:

United States Patent Office 2,795,807
Patented June 18, 1957

2,795,807
BRUSHES
Léger Salvy, Oyonnax, France
Application November 29, 1952, Serial No. 323,220
Claims priority, application France August 25, 1952
7 Claims. (Cl. 15—176)

This invention relates to a brush, characterised by the fact that it comprises a frame in two parts, one of which forms or is rigidly secured to the handle, the other being fixed to the first part in a detachable manner and receiving or forming the brushing part or mounting, so that this brushing part can be separated from the handle if desired.

This essential feature allows either different mountings to be used on the same handle or to change a worn-out mounting for a similar new one, still retaining the same handle.

The detachable part of the frame, receiving or forming the brushing element, may comprise profiled edges engaging in corresponding profiled grooves provided on the fixed part forming the handle or rigidly secured to the same, or vice versa.

The detachable part of the frame receiving or forming the mounting may be of supple or even resilient material, so that it may fit perfectly to the contour of the fixed part.

The accompanying drawings illustrate one possible form of construction of the invention, which is given by way of example but not of limitation.

Figure 1:
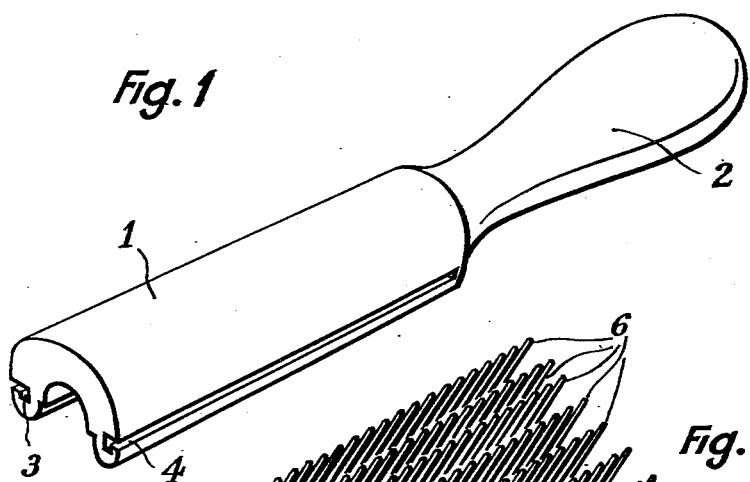
Fig. 1 is a perspective view of the fixed part of a hairbrush constructed according to the invention.
Figure 2:
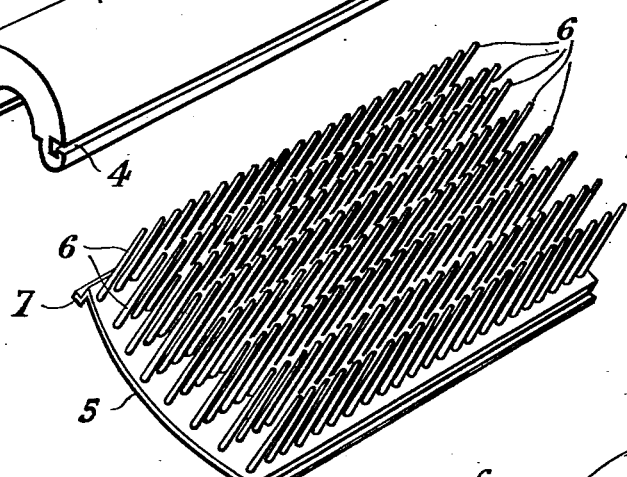
Fig. 2 is a perspective view of the detachable part of the said brush.
Figure 3:
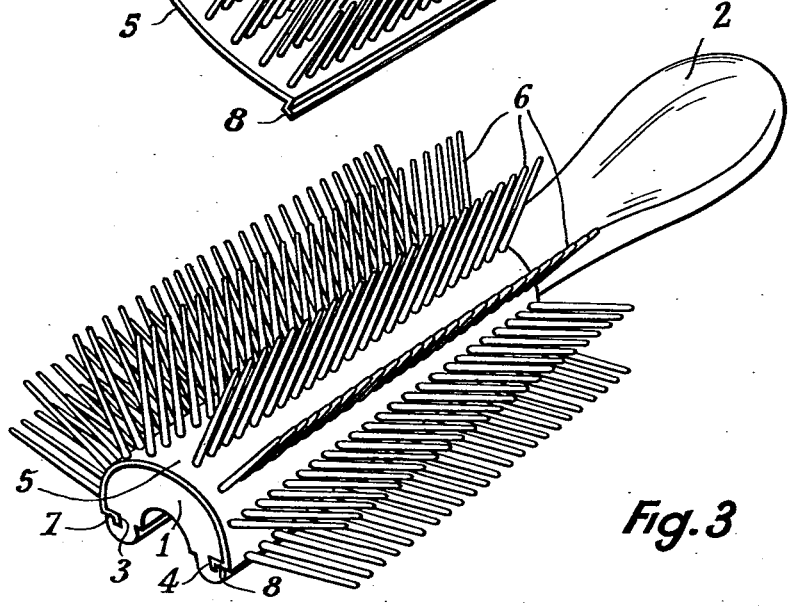
Fig. 3 is a perspective view of the brush when assembled.

The brush comprises on the one hand (Fig. 1) a part 1, rigidly secured to a handle 2, and having two profiled parallel grooves 3 and 4 laterally, and on the other hand (Fig. 2), a part of supple material 5 receiving the brushing elements 6 and having profiled parallel grooves 7 and 8 laterally, the profile corresponding to that of the grooves 3 and 4 of part 1. The profiled edges 7 and 8 engage in the grooves 3 and 4 respectively, the part 5 embracing the contour of part 1, as illustrated in Fig. 3.

It can be seen that the part 5 can be separated from the part 1 or united to it immediately. Thus, for one handle, several parts 5 comprising similar or different mountings or brushing parts may be provided, so that if desired, a worn-out mounting can be replaced by a similar new mounting, or a mounting provided for one definite use can be replaced by one designed for a different use, the same handle still being retained.

In the example given, the part 1 and the handle 2 are moulded in one piece, for example in a plastic material, such as polystyrene. Likewise the part 5 and the mounting 6 are moulded in one piece, for example in a plastic material such as alkatene. But it is obvious that it is not important what materials and manufacturing processes are used. It is also obvious that the part 1 and the handle 2 might also be made not in one piece but in two parts subsequently assembled. Similarly the mounting 6 could be of any kind whatsoever, vegetable, animal, metallic or synthetic, and might be fixed by any appropriate means to a part 5 of any material whatsoever, supple or rigid.

The details of construction and mounting may be generally varied according to circumstances and to the requirements of practical application, and the various members or means described or represented merely by way of example may be replaced by others serving the same purpose or giving the same result, without going outside the ambit of the invention.

What is claimed as new and desired to be secured by Letters Patent is:

1. A brush comprising, in combination, an elongated base member having an arcuate transversely curved supporting surface including two longitudinally extending lateral face portions, said base member being formed with two longitudinally extending grooves respectively located in said lateral face portions, each of said grooves having a first portion extending inwardly from the respective lateral face portion and a second portion extending transverse to said first portion; a resilient bristle membed including a sheet superimposed in resiliently bent condition upon said arcute supporting surface and having along the longitudinal side edges thereof projections engaging said grooves and being slidable in the same in longitudinal directions, said bristle member including bristles projecting outwardly from said sheet and being integral with said sheet, the bristles extending substantially perpendicular to said arcuate surface, and some bristles being inclined with respect to other bristles, said sheet being adapted to be detached by longitudinal movement with respect to said base member and to resiliently assume a condition located in a plane so that said bristles extend parallel to each other and are adapted to be molded together with said sheet.

2. A brush as set forth in claim 1 wherein each bristle is resiliently bendable at all points along the length thereof.

3. A brush as set forth in claim 1 wherein the second portion of the grooves extends in a direction away from said arcuate surface of the base member.

4. A brush as set forth in claim 1 wherein said second portion of the grooves extends substantially parallel to the respective lateral face portions of said arcuate surface of the base member.

5. A brush as set forth in claim 1 wherein said first portion of the grooves extends inwardly a distance only slightly greater than the thickness of said sheet.

6. A brush comprising, in combination, an elongated base member having a handle and an arcuate transversely curved supporting surface including two longitudinally extending lateral face portions, said base member being formed with two longitudinally extending grooves respectively located in said lateral face portions, each of said grooves having a first portion extending inwardly from the respective lateral face portion and a second portion extending transverse to said first portion, said base member including stop means at the end of said grooves located adjacent the handle; a resilient bristle member including a sheet superimposed in resiliently bent condition upon said arcuate supporting surface and having along the longitudinal side edges thereof projections engaging said grooves and being slidable in the same in longitudinal directions toward and away from said stop means, said bristle member including bristles projecting outwardly from said sheet and being integral with said sheet, the bristles extending substantially perpendicular to said arcuate surface, and some bristles being inclined with respect to other bristles, said sheet being adapted to be detached by longitudinal movement with respect to said base member and to resiliently assume a condition located in a plane so that said bristles extend parallel to each other and are adapted to be molded together with said sheet.

7. A brush comprising, in combination, an elongated base member having an arcuate transversely curved supporting surface including two longitudinally extending lateral face portions, said base member being formed with two longitudinally extending grooves respectively located in said lateral face portions, each of said grooves having a first portion extending inwardly from the respective lateral face portion and a second portion extending transverse to said first portion; a resilient bristle member including a sheet superimposed in resiliently bent condition upon said arcuate supporting surface and having along the longitudinal side edges thereof projections engaging said grooves and being slidable in the same in longitudinal directions, said bristle member including longitudinally extending parallel rows of bristles projecting outwardly from said sheet and being integral with said sheet, the bristles of each row extending substantially perpendicular to said arcuate surface, and being inclined to the bristles of the other rows, each bristle being resiliently bendable at all points along the length thereof, and each said bristle being gradually tapered and projecting from said sheet a distance substantially greater than the thickness of the sheet at the area thereof from which said bristle projects, said sheet being adapted to be detached by longitudinal movement with respect to said base member and to resiliently assume a condition located in a plane so that said bristles extend parallel to each other and are adapted to be molded together with said sheet.

References Cited in the file of this patent

UNITED STATES PATENTS

| | | |
|---|---|---|
| 187,682 | Vannice | Feb. 20, 1877 |
| 1,058,273 | Thompson | Apr. 8, 1913 |
| 1,939,344 | Garland | Dec. 12, 1933 |
| 2,029,426 | Kingdon | Feb. 4, 1936 |
| 2,227,635 | Dean | Jan. 7, 1941 |
| 2,607,064 | Sullivan | Aug. 19, 1952 |